Patented Feb. 12, 1952

2,585,550

UNITED STATES PATENT OFFICE 2,585,550

PARA-HALOGENPHENYL-PYRIDYL-ALKANONES

Karl Hoffmann, Binningen, and Eugen Tagmann, Basel, Switzerland, assignors to Ciba Pharmaceutical Products, Inc., Summit, N. J.

No Drawing. Application August 21, 1950, Serial No. 180,702. In Switzerland March 2, 1950

5 Claims. (Cl. 260—296)

This invention relates to the manufacture of para-halogenphenyl-pyridyl-alkanones of the formula

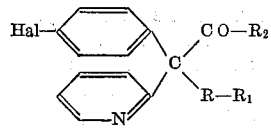

and their salts. In the above formula, R indicates a bivalent aliphatic hydrocarbon radical with two to six carbon atoms, such for example, as an ethylene or propylene group, $R_1$ indicates

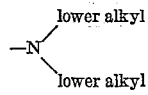

especially a dimethylamino group,

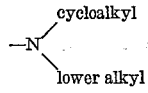

or —N=D, D representing the atoms necessary to complete an alkyleneimino group, for example, a pyrrolidine or piperidine ring, $R_2$ indicates a lower aliphatic, straight or branched hydrocarbon radical, such as a methyl, ethyl or propyl group; and Hal is a halogen atom, especially chlorine.

The new compounds exhibit interesting pharmacological properties. Thus they have a lasting histaminolytic effect. Of particular value is the 1 - dimethyl - amino - 3 - pyridyl-(2')-3-(para-chloro-phenyl)-hexanone-(4) and its salts. The new substances are intended for application as medicaments.

According to one feature of the present invention the new alkanones are obtained e. g. when para-halogenphenyl-pyridyl-alkane carboxylic acid nitriles of the formula

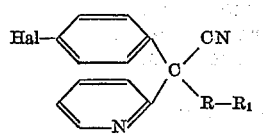

wherein R, $R_1$, and Hal have the aforementioned significance, are reacted with metal organic compounds, especially with such of the Grignard type, such as corresponding alkyl magnesium halides. The ketimides obtained in this reaction are treated in the customary manner, for example with mineral acid, whereby the desired ketones are formed.

The starting materials employed in the above processes may be obtained according to customary methods.

According to the method of working the new alkanones are obtained in the form of the free bases or their salts. From the bases salts may be produced, as for example those of the hydrohalic acids, sulphuric acid, nitric acid, phosphoric acid, acetic acid, propionic acid, oxalic acid, malic acid, citric acid, benzoic acid, salicylic acid, para-aminosalicyclic acid, methane sulphonic acid, ethane sulphonic acid or toluene sulphonic acid.

The following examples illustrate the invention, the relation between parts by weight and parts by volume being the same as that between the kilogram and the liter:

*Example 1*

15.1 parts by weight of ω-dimethylamino-α-(para-chloro-phenyl)-α-pyridyl-(2)-butyric acid nitrile, dissolved in 100 parts by volume of absolute benzene, are added to a Grignard solution produced from 4.7 parts by weight of magnesium, 100 parts by volume of absolute ether and 26.1 parts by weight of ethyl bromide, the addition being made in portions, and the whole is then heated under reflux for one hour. The reaction mixture is poured into a mixture consisting of 200 parts by weight of ice and 100 parts by volume of concentrated hydrochloric acid and allowed to stand for one hour. The ethereal solution is separated and the acid aqueous solution rendered alkaline to phenolphthalein with caustic soda solution and extracted with ether. The ether extract is dried over potassium carbonate, the solvent distilled off and the residue distilled in high vacuum. The 1-dimethylamino-3-(para-chloro-phenyl)-3-pyridyl-(2')-hexanone-(4) of the formula

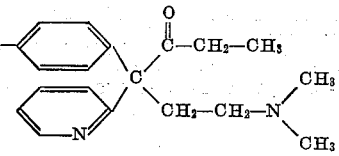

distils as a very viscous oil of yellowish fluorescence at 157–163° C. under a pressure of 0.25 mm.

The readily water soluble and very hygroscopic hydrochloride can be prepared by dissolving the base in absolute ethyl acetate and adding an equivalent quantity of dry hydrogen chloride, dissolved in ethyl acetate.

The ω - dimethylamino - α - (para - chloro-phenyl)-α-pyridyl-(2)-butyric acid nitrile employed above as starting material may be produced in the following manner:

To 15 parts by weight of para-chloro-benzyl-cyanide, dissolved in 150 parts by volume of absolute benzene there are added in portions at a temperature of 25–30° C., 4.4 parts by weight of powdered sodamide and thereupon 12.8 parts by weight of β-chlorethyl-dimethylamine added in portions at 30–35° C. After the reaction mixture has been maintained for 2 hours at 30° C., it is treated with water, the benzene solution extracted with dilute mineral acid, the acid extract rendered alkaline, the ω-dimethylamino-α-(para-chloro-phenyl)-butyric acid nitrile produced extracted with ether and the ethereal solution dried, the solvent evaporated and the residue distilled in high vacuum. The product distills at 114–116° C. under a pressure of 0.2 mm. Its hydrochloride melts at 165–170° C.

16.1 parts by weight of ω-dimethylamino-α-(para-chloro-phenyl)-butyric acid nitrile are dissolved in 150 parts by volume of absolute toluene and at a temperature of 55–60° C., 31.2 parts by weight of powdered sodamide added. After the reaction mixture has been left for one hour at this temperature, the reaction temperature is raised to 70–80° C., and in portions 14.1 parts by weight of 2-bromo-pyridine introduced. Finally the whole is maintained for one hour at 80° C., allowed to cool, treated with water, the toluene solution extracted with dilute hydrochloric acid and the acid extract rendered alkaline with caustic soda solution and extracted with ether. The ethereal solution is dried with potassium carbonate, the solvent distilled off and the residue distilled under reduced pressure. The ω-dimethylamino - α - (para-chloro-phenyl)-α-pyridyl-(2)-butyric acid nitrile of the formula

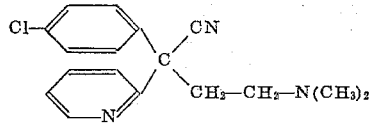

passes over as a viscous oil at 154–164° C. under a pressure of 0.2 mm.

Example 2

A Grignard solution is made from 4.7 parts by weight of magnesium, 100 parts by volume of absolute ether and 26.1 parts by weight of ethyl bromide, and to this solution there are added in portions 17.2 parts by weight of ω-diethylamino-α - (para - chloro-phenyl)-α-pyridyl-(2) butyric acid nitrile, dissolved in 100 parts by volume of absolute benzene. After the reaction mixture has been refluxed for 1 hour, the whole is poured into a mixture of 200 parts by weight of ice and 100 parts by volume of concentrated hydrochloric acid, and the whole is allowed to stand for 1 hour with occasional stirring. By the method of working up described in Example 1, there is obtained 1 - diethylamino - 3 - (para - chloro-phenyl) - 3 - pyridyl-(2)-hexanone-(4) of the formula

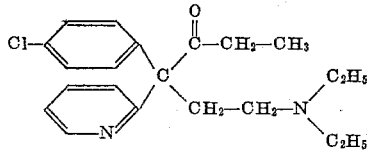

in the form of a yellow oil of boiling point 160–168° C. under 0.15 mm. pressure.

The ω - diethylamino-α-(para-chloro-phenyl)- α-pyridyl-(2)-butyric acid nitrile used as starting material in this example can be prepared in a manner analogous to that described in Example 1 by using for the reaction, instead of 12.8 parts by weight of β-chlorethyl-dimethylamine, 16.3 parts by weight of β-chlorethyl-diethylamine and then converting the ω-diethylamino-α-(para-chloro-phenyl)-butyric acid nitrile of boiling point 130–134° C. (under 0.4 mm. pressure) by means of 2-bromo-pyridine and sodamide into the ω - diethylamino-α-(para-chloro-phenyl)-α-pyridyl-(2)-butyric acid nitrile of the formula

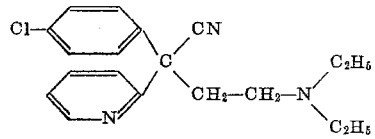

which boils at 170–178° C. under 0.15 mm. pressure.

Example 3

19.1 parts by weight of ω-(N-methyl-N-cycloheptylamino)-α-(para-chloro-phenyl)-α-pyridyl-(2)-butyric acid nitrile, dissolved in 100 parts by volume of absolute benzene, are added in portions to a Grignard solution, prepared from 4.8 parts by weight of magnesium, 27.5 parts by weight of ethyl bromide and 80 parts by volume of absolute ether at a temperature of 40–45° C. and the whole then stirred for one hour at this temperature. By the method of working up described in Example 1, there is obtained the 1-(N-methyl-N-cycloheptyl-amino)-3-(para - chloro - phenyl)-3-pyridyl-(2)-hexanone-(4) of the formula

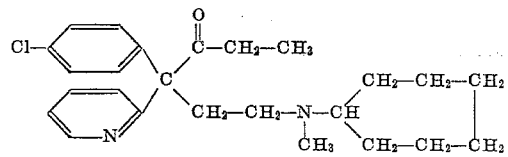

in the form of a thickly liquid oil with a greenish fluorescence, which boils at 198–207° C. under 0.25 mm. pressure, and which can be converted into the water soluble hydrochloride in the usual manner by treatment with hydrochloric acid gas.

The ω - (N - methyl - N-cycloheptyl-amino)-α-(para-chloro-phenyl)-α-pyridyl-(2)-butyric acid nitrile of boiling point 210–218° C. (under 0.2 mm. pressure) can be prepared e. g. by the method described in Example 1. By starting from para-chloro-benzylcyanide and reacting with β-chlorethyl-N-methyl-N-cycloheptyl-amine by means of sodamide, there is obtained ω-(N-methyl-N-cycloheptylamino)-α-(para-chloro-phenyl) - butyric acid nitrile boiling at 180–185° C. under 0.15 mm. pressure which can be converted with 2-bromo-pyridine and sodamide as condensing agent into the ω-(N-methyl-N-cycloheptyl-amino)-α-(para-chloro-phenyl)-α-pyridyl - (2) - butyric acid nitrile of the formula

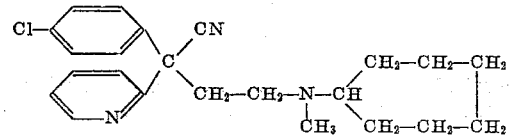

The β-chlorethyl - N - methyl-N-cycloheptyl-amine of boiling point 118–119° C. (under 11 mm. pressure) can be prepared, for example, from suberone and 1-hydroxy-2-amino-ethane with simultaneous catalytic hydrogenation of the intermediately formed Schiff base, subsequent N-methylation, and conversion of the resultant β-hydroxyethyl-N-methyl-N-cycloheptyl-amine by means of thionyl chloride into the β-chlorethyl-N-methyl-N-cycloheptyl-amine.

*Example 4*

10.2 parts by weight of ω-(N-methyl-N-cyclopentyl-amino) - α - (para-chloro-phenyl) -α-pyridyl-(2)-butyric acid nitrile, dissolved in 70 parts by volume of absolute benzene, are added in portions to a Grignard solution, prepared from 2.7 parts by weight of magnesium, 50 parts by volume of absolute ether and 12.0 parts by weight of n-propyl bromide at 40–45° C. and the reaction mixture then allowed to stand for one hour at this temperature. By the method of working up described in Example 1, there is obtained 1-(N-methyl-N-cyclopentyl - amino) - 3 - (para-chloro-phenyl)-3-pyridyl-(2)-heptanone - (4) of the formula

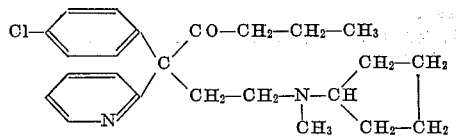

in the form of a highly viscous, yellow oil of boiling point 192–197° C. (under 0.2 mm. pressure).

The hydrochloride, prepared by dissolving the base in ethyl acetate and adding an equivalent quantity of hydrochloric acid gas, dissolved in ethyl acetate, is a hygroscopic salt which readily dissolves in water.

The ω-(N-methyl - N - cyclopentyl - amino) -α-(para-chloro-phenyl)-α-pyridyl-(2)-butyric acid nitrile used as starting material in this example can also be prepared by the methods described in the preceding examples, starting from para-chloro-benzylcyanide, which is reacted with β-chlorethyl-N-methyl - N - cyclopentyl - amine by means of sodamide as condensing agent to form the ω-(N-methyl-N-cyclopentyl-amino) -α-(para-chloro-phenyl)-butyric acid nitrile, which in turn is condensed with sodamide and 2-bromo-pyridine to ω-(N-methyl-N-cyclopentyl-amino) -α-(para-chloro-phenyl)-α-pyridyl-(2)-butyric acid nitrile of the formula

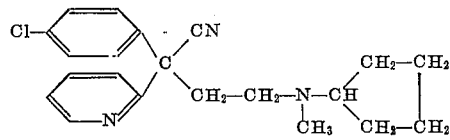

boiling at 185–191° C. under 0.2 mm. pressure.

*Example 5*

In a manner analogous to that described in the foregoing examples, there may be obtained 1-pyrrolidino-3-(para-chloro-phenyl) - 3 - pyridyl-(2)-hexanone-(4) of boiling point 165–172° C. (under 0.3 mm. pressure) having the formula

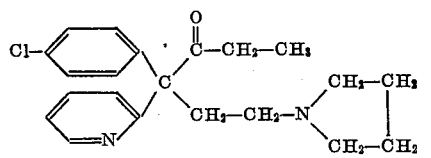

by starting from ω-pyrrolidino-α-(para-chlorophenyl)-α-pyridyl-(2)-butyric acid nitrile boiling at 178–184° C. under 0.3 mm. pressure and reacting it with ethyl-magnesium-bromide. There may be obtained e. g. the water soluble hydrochloride from the product by proceeding in the usual way.

The ω-pyrrolidino-α-(para-chloro-phenyl)-α-pyridyl-(2)-butyric acid nitrile can also be prepared in analogy to the method of the preceding examples, the ω-pyrrolidino - α - (para-chlorophenyl)-butyric acid nitrile of boiling point 138–143° C. (under 0.25 mm. pressure) being obtained as intermediate product.

*Example 6*

From ω-piperidino-α-(para-chloro-phenyl)-α-pyridyl-(2)-valeric acid nitrile boiling at 193–198° C. under 0.25 mm. pressure, there is obtained by reaction with methyl-magnesium-iodide, the 1-piperidino- 4 -(para-chloro-phenyl) - 4 - pyridyl-(2)-hexanone-(5) of boiling point 176–182° C. (under 0.25 mm. pressure) and having the formula

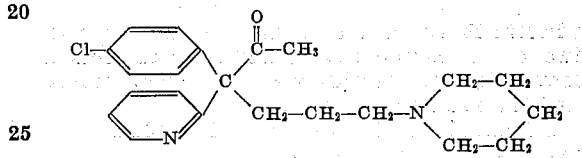

ω-Piperidino - α - (para-chloro-phenyl) -α-pyridyl-(2)-valeric acid nitrile, the starting material used in this example, can be prepared according to the preceding examples from para-chlorobenzylcyanide which is reacted in stages with γ-chloropropyl-piperidine and 2-bromo-pyridine by means of sodamide, ω-piperidino-α-(parachloro-phenyl)-valeric acid nitrile of boiling point 164–165° C. (under 0.5 mm. pressure) being obtained as intermediate product.

By starting from γ-dimethyl-amino-α-(para-chloro-phenyl)-α-pyridyl-(2′)-valeric acid nitrile there may be obtained in analogous manner the 2-dimethylamino-4-(para-chloro-phenyl)-4-pyridyl-(2′)-heptanone-(5) of the formula

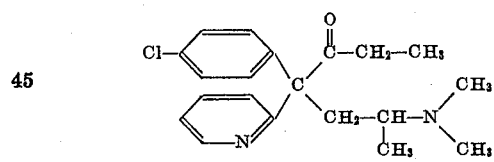

What we claim is:

1. A member of the group consisting of para-halogen-phenyl - pyridyl - alkanones and their salts, the said alkanones being of the formula

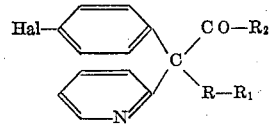

wherein R stands for an alkylene radical with two to six carbon atoms, $R_1$ stands for a member of the group consisting of

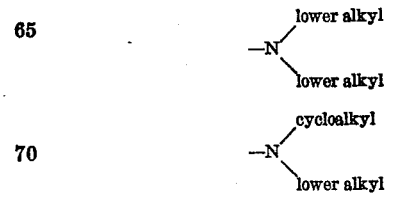

piperidino and pyrrolidino radicals, and $R_2$ represents a lower alkyl radical, and Hal is a halogen atom.

2. A para-halogenphenyl-pyridyl-alkanone of the formula

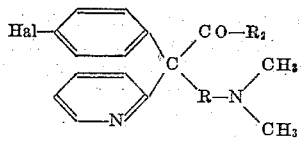

wherein R stands for an alkylene radical with two to six carbon atoms, and R₂ represents a lower alkyl radical with one to six carbon atoms, and Hal is a halogen atom.

3. An acid salt of a para-halogenphenyl-pyridyl-alkanone of the formula

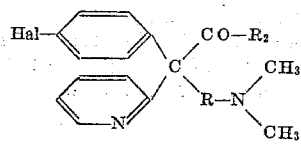

wherein R stands for an alkylene radical with two to six carbon atoms, and R₂ represents a lower alkyl radical with one to six carbon atoms, and Hal is a halogen atom.

4. 1-dimethylamino-3-(para-chloro-phenyl)-3-pyridyl-(2')-hexanone-(4).

5. An acid salt of 1-dimethylamino-3-(para-chloro-phenyl)-3-pyridyl-(2')-hexanone-(4).

KARL HOFFMANN.
EUGEN TAGMANN.

REFERENCES CITED

The following references are of record in the file of this patent:

UNITED STATES PATENTS

| Number | Name | Date |
|---|---|---|
| 2,411,664 | Miescher et al. | Nov. 26, 1946 |
| 2,542,466 | Blicke | Feb. 20, 1951 |

FOREIGN PATENTS

| Number | Country | Date |
|---|---|---|
| 11,197 | Great Britain | 1906 |
| 884,740 | France | Aug. 25, 1943 |
| 589,625 | Great Britain | June 25, 1947 |

OTHER REFERENCES

Tislow et al.: Federation Proc., vol. 8, p. 338 (1949).

Bockmuhl et al.: Liebig's Ann., vol. 561, pp. 52–85 (1948).